(12) United States Patent
Lee et al.

(10) Patent No.: US 6,665,899 B2
(45) Date of Patent: Dec. 23, 2003

(54) WASHING MACHINE AND ITS WASHING METHOD

(75) Inventors: Joon-Yeop Lee, Seoul (KR); Ki-Su Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 386 days.

(21) Appl. No.: 09/726,529

(22) Filed: Dec. 1, 2000

(65) Prior Publication Data

US 2003/0034054 A1 Feb. 20, 2003

(30) Foreign Application Priority Data

Sep. 19, 2000 (KR) ........................................ 2000-54981

(51) Int. Cl.[7] ................................................ D06F 33/00
(52) U.S. Cl. ................................ 8/158; 8/159; 68/12.12
(58) Field of Search ............................. 68/12.12; 8/158, 8/159

(56) References Cited

U.S. PATENT DOCUMENTS 5,327,603 A * 7/1994 Roh et al. ...................... 8/159
5,469,719 A * 11/1995 Imai et al. ................. 68/12.12

* cited by examiner

*Primary Examiner*—Zeinab El-Arini
(74) *Attorney, Agent, or Firm*—Robert E. Bushnell, Esq.

(57) ABSTRACT

A novel washing machine and a novel method for washing clothes. Depending on the type of cloth to be washed, one of four washing modes is selected. A pulsator and a spin-dry tub rotate in various directions and speeds depending on the wash mode selected. Thus causes varying degree of agitation during the wash cycle. A power switching motor controls a brake and a clutch to cause the pulsator and the spin-dry tub to rotate depending on the wash mode selected. Thus, the pulsator and the spin-dry tub are capable of rotating either forward, backward, agitate in both directions, or not to rotate the tub at all depending on the wash mode selected.

17 Claims, 10 Drawing Sheets

WASHING MACHINE AND ITS WASHING METHOD

CLAIM OF PRIORITY

This application makes reference to, incorporates the same herein, and claims all benefits accruing under 35 U.S.C. §119 from my application WASHING MACHINE AND THE WASHING CONTROL METHOD filed with the Korean Industrial Property Office on Sep. 19, 2000 and there duly assigned Serial No. 54981/2000.

BACKGROUND OF THE INVENTION

1. Field of the Invention

The present invention relates to a fully automated washing machine, and more particularly to a washing machine and its washing method adapted to form a variety of water current according to power multi-switched by a power switching motor operated being separated from a drainage motor, thereby embodying a new washing method appropriate to cloths.

2. Description of the Prior Art

A water tub 1 according to the prior art includes, as illustrated in FIG. 1, a driving motor 3 formed at a bottom external side thereof for generating a driving force, and power transmission means 2 centrally formed at a bottom surface, a drainage hole 1a connected to a drainage hose 4 disposed at a predetermined distance from the power transmission means 2 for draining water in the water tub 1 and a drainage motor 6 arranged at a predetermined distance from the drainage hole 1a for controlling the drainage hole 1a.

FIG. 2 is a schematic drawing for illustrating power transmission means 2 according to the prior art, where the means 2 is mounted with a pulley 12 at a lower tip end relative to periphery of a driving shaft 10, with the pulley 12 coupled by a driving shaft coupling 14 at an upper side thereof, and the driving shaft coupling 14 is rotably provided thereon with a gear case 16.

The gear case 16 is mounted at an upper periphery thereof with a rotable drum 18 and the drum 18 is equipped at an upper inner peripheral surface thereof with a driven shaft coupling 20. The driven shaft coupling 20 is mounted thereon with a spin-dry tub 24 coupled by a plurality of bolts 22. The spin-dry tub 24 is equipped thereon with a pulsator 28 via a bolt 26, and is also arranged with a unidirectional clutch bearing 46 abraded by rotational direction of the gear case 16 to rotate the gear case to one direction.

At an upper periphery of the driving shaft coupling 14 and at a lower periphery end of the gear case 16 there is mounted a clutch spring 30 and the clutch spring 30 is peripherally formed with a clutch holder 32 while the clutch holder 32 is peripherally provided with a sleeve member 36 via a brake ring 34.

The clutch spring 30 is connected at one tip end thereof to the gear case 16 while the clutch holder 32 is connected to the other tip end thereof. The sleeve member 36 is formed at one side thereof with a clutch lever 38, while the clutch lever 38 and brake lever 40 are cooperatively moved by a connecting lever 42 connected to the drainage motor 6.

The drainage motor 6 is installed at one side thereof with a connecting bracket 8 via a steel wire 8a for controlling the power transmission means 2 and opening and closing of a drainage hole 1a.

The connecting bracket 8 is cooperated to the drainage motor 6 during its operation at a first step to activate the brake lever 40 connected to the connecting lever 42 at the power transmission means 2 and simultaneously open the drainage hole 1a.

In the power transmission means 2 thus constructed, when the washing course is selected, the drainage motor becomes inoperated, while, simultaneously the driving shaft coupling 14, driving shaft 10 and the pulsator 28 connected to the power line are rotated to form water current to water supplied to the spin-dry tub 24 and to agitate the laundry.

Meanwhile, when the spin-dry course is selected, the connected bracket 8 is pulled via the steel wire 8a connected to one side of the drainage motor 6 according to operation of the drainage motor at its first step while the connecting bracket 8 pulls a cap that has been blocking the drainage hole 1a with the connecting lever 42 connected to one side thereof, to thereby drain the water in the water tub 1 through the drainage hose 4 connected to the drainage hole a.

In other words, the washing machine is disposed with a unidirectional brake band 44 formed at a periphery of the drum 18 for controlling the rotation of the spin-dry tub 24 in the water tub 1 and the pulsator 28, a unidirectional clutch bearing 46 formed at a periphery of the gear case 16, a clutch spring 30 for connecting and disconnecting the power between a washing axle line (by way of example, the driving shaft coupling connected to the driving shaft) and a spin-dry axle line (by way of example, the gear case), and the drainage motor 6 formed at a bottom side of the water tub 1 for controlling the operation of the unidirectional brake band 44 and the clutch spring 30 and opening and closing of the drainage hole 1a.

However, there is a problem in the washing machine thus constructed according to the prior art in that the drum 18 is braked not to rotate to both directions by operations of the unidirectional brake band 44 and unidirectional clutch bearing 46 and the washing axle line is rotated while power with the spin-dry axle line is disconnected by unwinding operation of the clutch spring 30, such that the pulsator 28 is rotated forward and backward while the spin-dry tub 24 is not rotated during the washing course to thereby prevent from making more than one kind of water current.

There is another problem in that the water current made by the pulsator 28 which is relatively strong cannot adequately cope with a variety of cloths, thereby damaging the cloths.

SUMMARY OF THE INVENTION

The present invention is disclosed to solve the aforementioned problems and it is an object of the present invention to provide a washing machine adapted in clutch structure to have a power switching motor for controlling a brake band and a clutch spring in multi-stage and for determining water current embodiment and washing method.

It is another object of the present invention to provide a washing control method for embodying various water current according to the clutch structure and operation of drainage motor to cope with varying clothes and to make an adequate water current for protection of clothes thereby preventing in advance damage to the cloths.

In accordance with one object of the present invention, there is provided a fully automated washing machine, the washing machine comprising:

a spin-dry tub rotably disposed in a water tub and connected to a drum and a gear case via a power line;

a pulsator rotably disposed in the spin-dry tub and connected to a driving shaft coupling and a driving shaft via power line;

a brake band for braking and releasing the rotation of the drum;

a clutch spring for disconnecting and connecting the power of the driving shaft coupling and the gear case; and power switching motor for controlling in multi-stage operations of clutch spring and the brake band.

In accordance with another object of the present invention, there is provided a washing method comprising:

a first washing mode wherein only a pulsator is repeated in forward and backward rotations while a power switching motor is inoperative;

a second washing mode wherein the pulsator and a spin-dry tub conversely repeat forward and backward rotations according to a first step control of the power switching motor;

a third washing mode therein the spin-dry tub and the pulsator repeat forward and backward rotation in one direction according to a second step control of the power switching motor; and a fourth washing mode wherein the pulsator rotates in forward and backward rotations according to forward and backward rotations of a driving motor while the spin-dry tub repeats only forward rotation under the third washing mode.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiments regarding clutch structure of a washing machine and washing control method according to the clutch structure of the present invention will now be described in detail with reference to the accompanying drawings.

Figure 1:
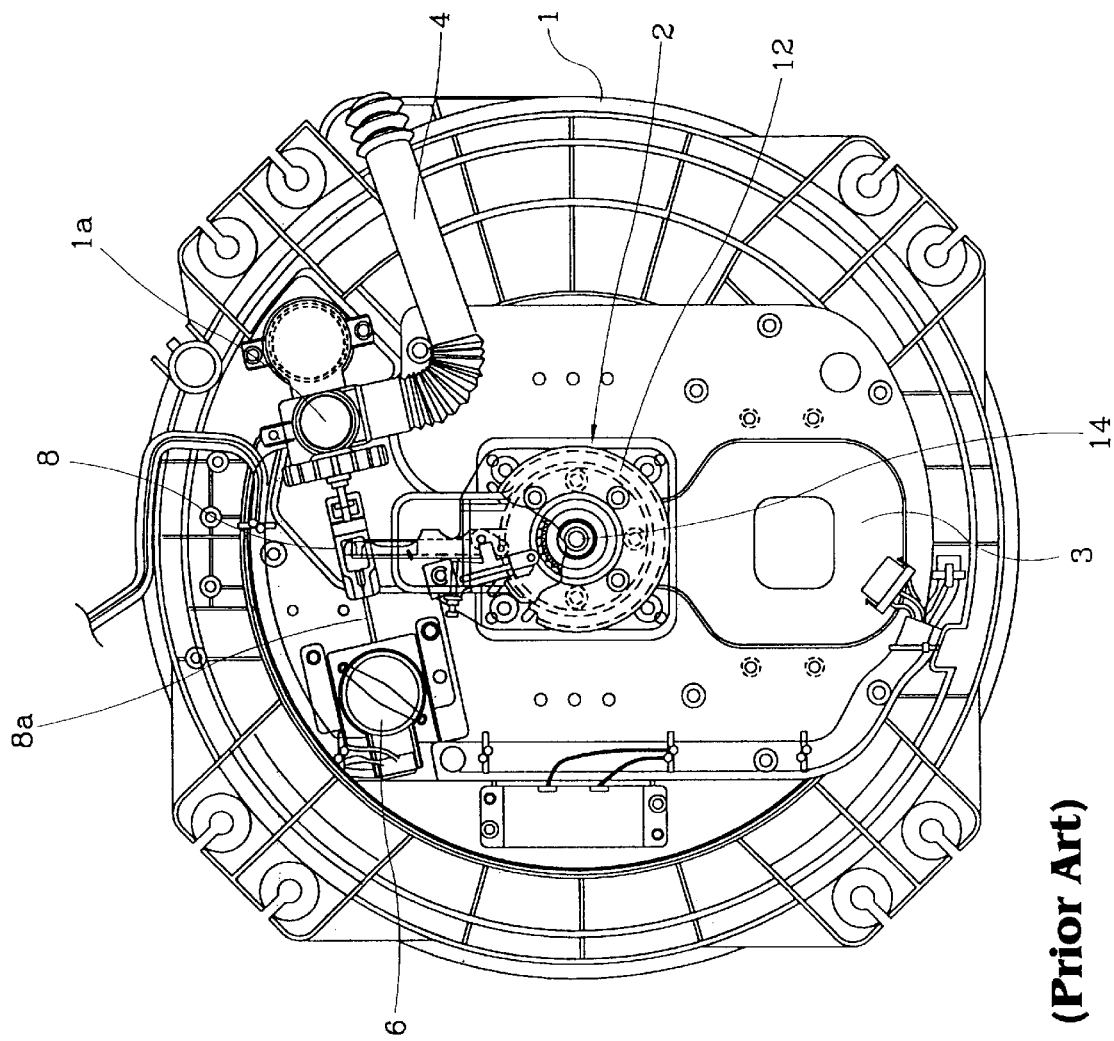
FIG. 1 is a bottom view for illustrating relation among a driving motor, power transmission means, drainage motor and drainage hole according to the prior art.
Figure 2:
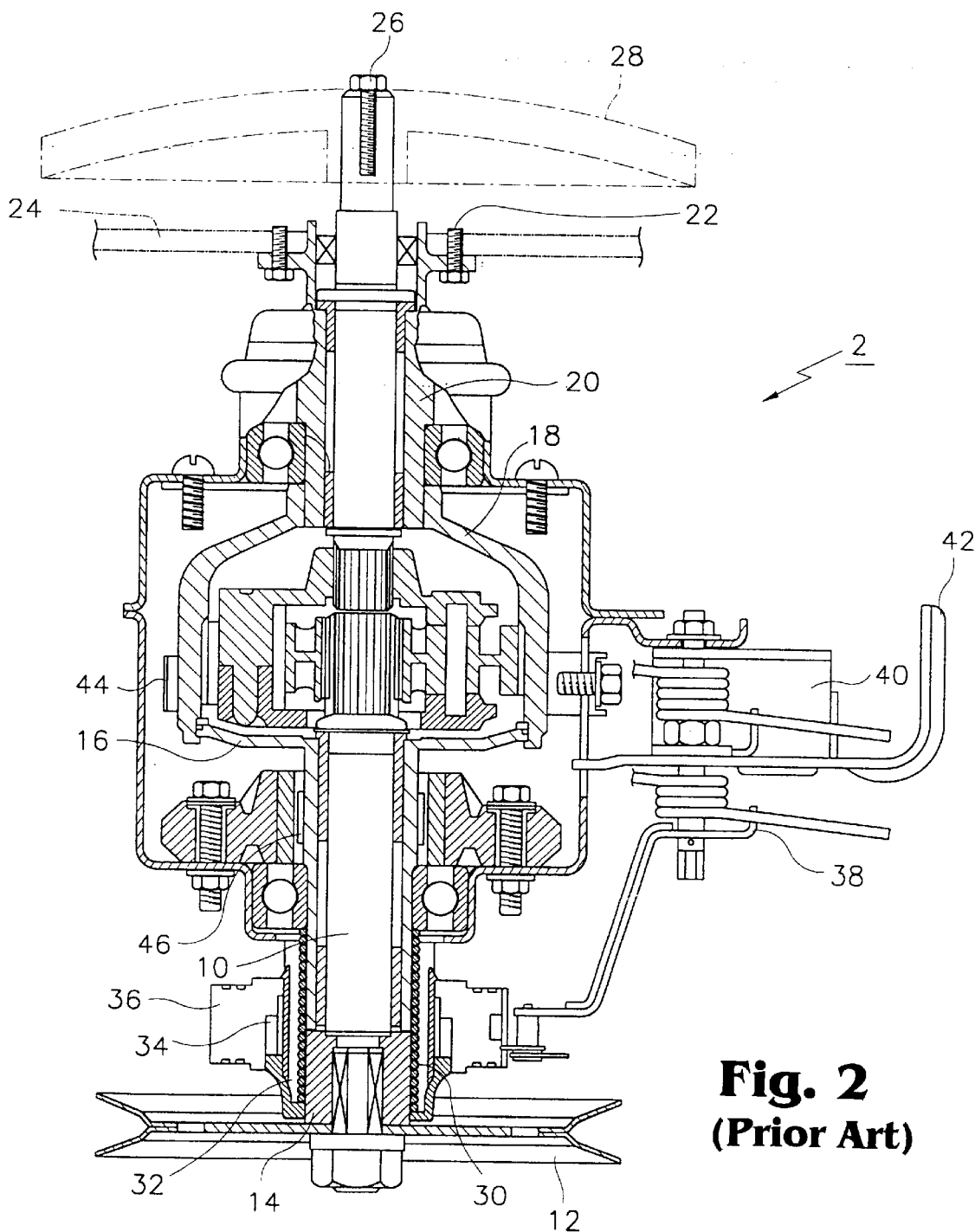
FIG. 2 is a lateral sectional view for illustrating power transmission means according to the prior art.
Figure 3:
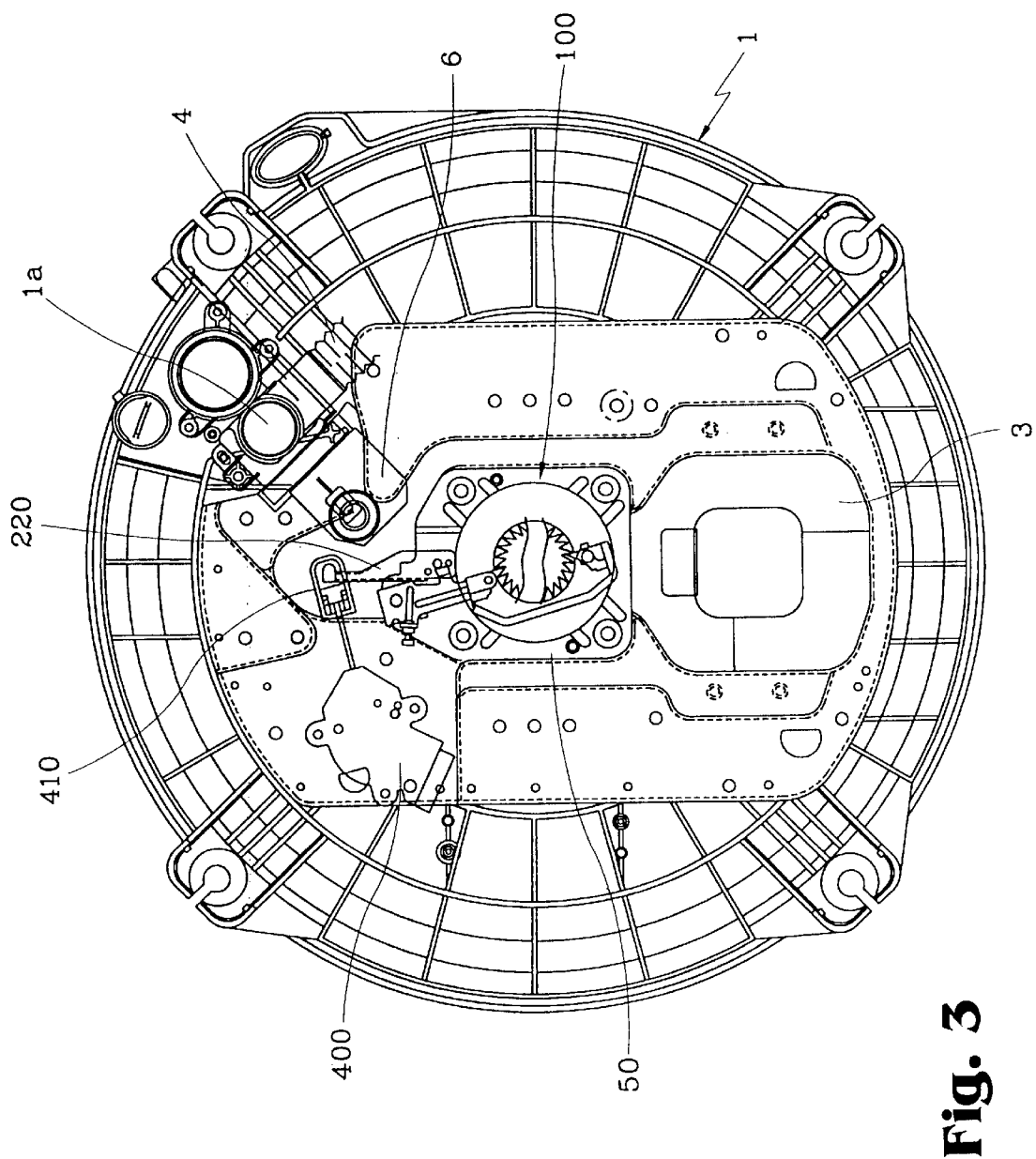
FIG. 3 is a bottom view for illustrating relation among a driving motor, power switching motor, drainage hole, and drainage motor installed at a water tub according to the present invention.

As illustrated in FIG. 3, the washing machine according to the present invention is constituted by a driving motor 3 disposed at a bottom external side of a water tub 1 and power transmission means 100 centrally formed at a side of the bottom.

The power transmission means 100 is constituted at a predetermined location distanced therefrom by a drainage hole 1a connected to a drainage hose 4 for draining water in the water tub 1 and a drainage motor 6 for opening and closing the drainage hole 1a. The power transmission means 100 is further constituted by a power switching motor 400 for controlling the power transmission means 100 at two stages via a connecting bracket 410.

Figure 4:
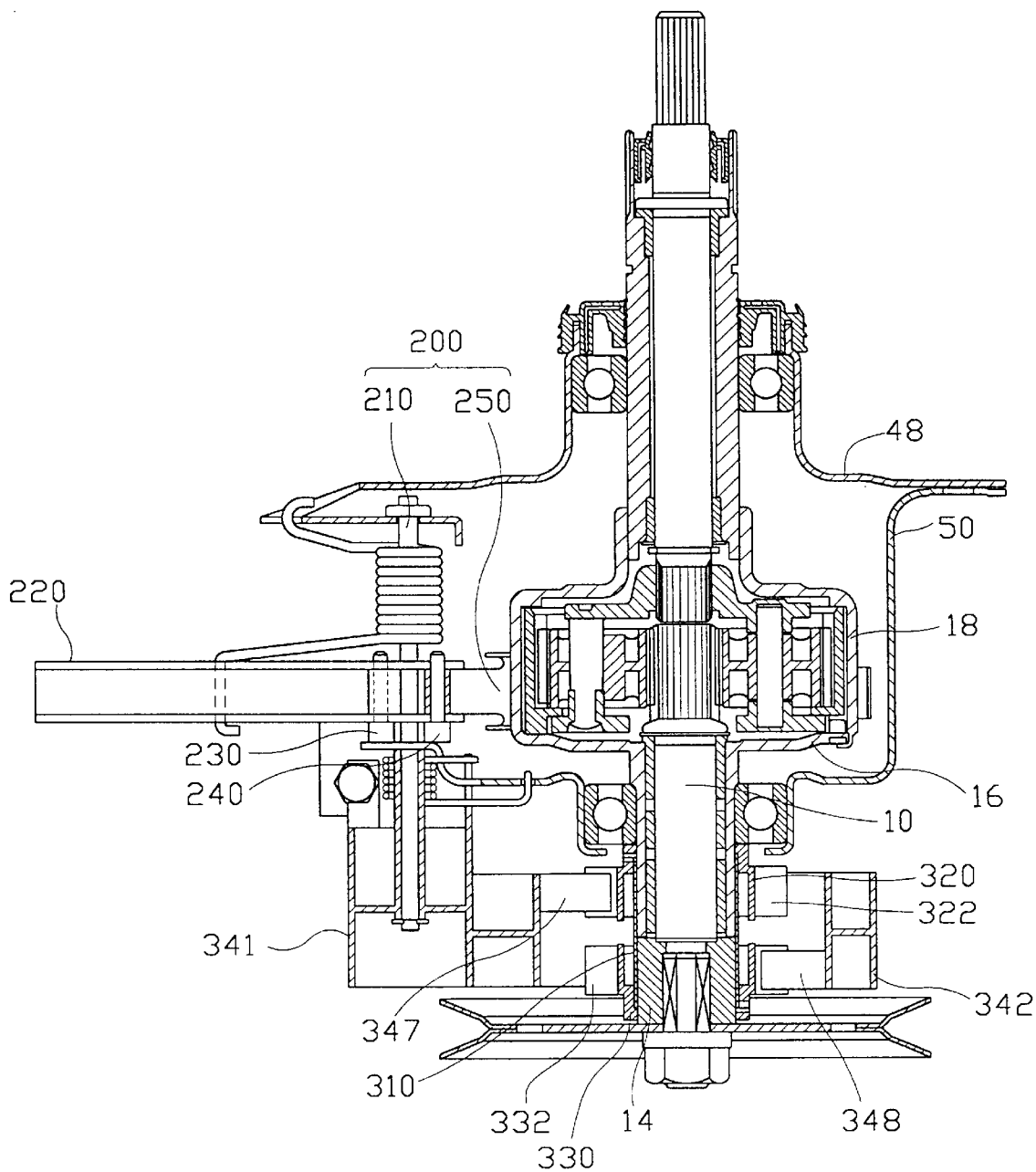
FIG. 4 is a lateral sectional view for illustrating power transmission means according to the present invention.

The power transmission means 100 includes, as illustrated in FIG. 4, a brake part 200 for controlling rotation of a drum 18 and a clutch part 300 for connecting and disconnecting power to a driving shaft coupling 14 connected to a washing axle line (by way of example, a driving shaft coupling connected to a driving shaft) and a spin-dry line (by way of example, gear case).

Figure 5:
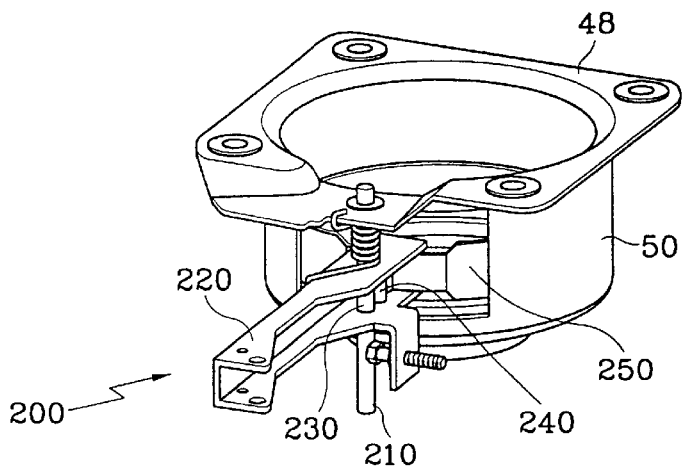
FIG. 5 is a perspective view for illustrating a coupled state of brake part according to the present invention.

The brake part 200 includes, as illustrated in FIGS. 4 and 5, a lever axle 210 perpendicularly coupled to one side between an upper housing 48 and a lower housing 50, a brake lever 220 rotably coupled to a periphery of the lever axle 210 and a brake band 250 for encompassing a periphery surface of the drum and respectively hinged at both ends thereof by first and second hinge pins 230 and 240 distanced at two predetermined positions from rotary center of the brake lever 220.

In other words, the lever axle 210 is coupled at an upper end thereof to a side relative to a margin of the upper housing 48 while a lower end of the lever axle 210 passes through one side relative to the margin of the lower housing 50 to protrude downwardly.

The brake lever 220 has a cross-sectional shape like "" in order to allow both tip ends of the brake band 250 to laterally penetrate at a predetermined depth.

The brake lever 220 is formed at upper/lower central position of one end thereof with an axle hole (not shown) for the lever axle 210 to freely and vertically pass therethrough. A first support hole (not shown) and a second hinge hole (not shown) are provided at front side and rear side for maintaining predetermined distance from a center of the axle hole (not shown) relative to the upper/lower surface of one end thereof to allow the first and second hinge pins 230 and 240 to be vertically inserted therethrough.

Figure 6:
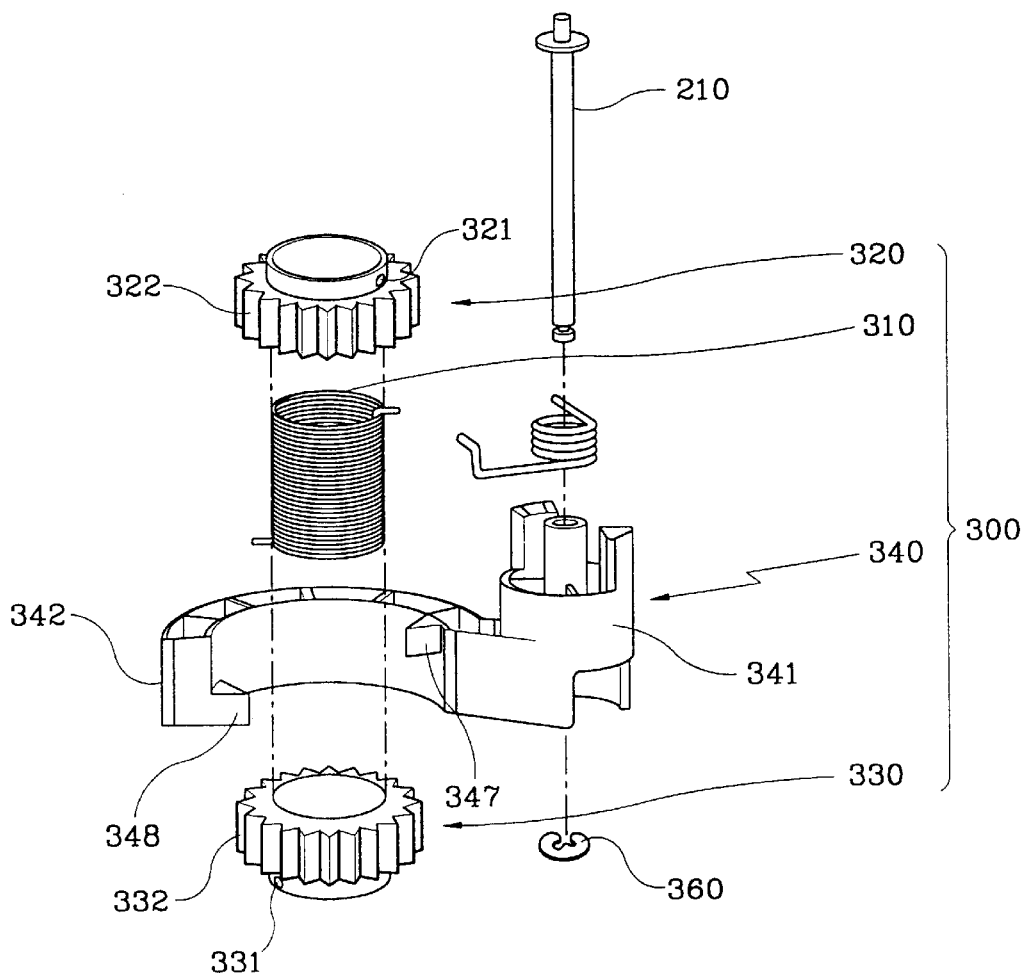
FIG. 6 is an exploded perspective view for illustrating a clutch part according to the present invention.

Furthermore, the clutch part 300 includes a clutch spring 310 spirally wound on a periphery at a border between the gear case 16 and the driving shaft coupling 14, and upper sleeve 320, lower sleeve 330, clutch lever 340 and snap ring 360 each coupled to upper end and lower end of clutch spring 310 relative to periphery of the gear case 16, as illustrated in FIGS. 4, 5 and 6.

The clutch lever 340 is rotably coupled to a peripheral lower end of the lever axle 210 at the brake part 200 in order to rotate the upper and lower sleeve 320 and 330 in mutually opposite directions or to be detached from the upper and lower sleeves 320 and 330 during washing course, and the snap ring 360 is coupled to a lower tip end of the lever axle 210 in order to prevent the clutch lever 340 from being separated downwards after coupled to the lever axle 210.

The upper and lower sleeves 320 and 330 are provided at upper/lower ends thereof with hitching holes 321 and 331 for hitching upper/lower tip ends of the clutch spring 310 to be hitched respectively and are peripherally formed with teeth 322 and 332 of gear for meshing the clutch lever 340. The teeth 322 and 332 of the gear have the upper/lower sleeves 320 and 330, each formed with teeth angles opposite therefrom.

The clutch lever 340 is formed at one side thereof with a coupling member 341 joining the lever axle 210 and is disposed at the other side thereof with a spanner part 342 for rotating the upper/lower sleeves 320 and 330 in mutually opposite directions or for detaching from the upper/lower sleeves 320 and 330.

The spanner part 342 has a semi-circular shape and is integrally formed at upper/lower ends of an inner curvature thereof with first and second latches 347 and 348 for the teeth 322 of gear at the upper sleeve 320 to be coupled to or separated from the teeth 332 of gear at the lower sleeve 330.

Now, operations of the driving motor 3, power transmission means 100, drainage motor 6 and power switching motor 400 according to the present invention thus constructed and control method thereof will be described.

When a washing course is selected, the drainage hole 1a formed at the bottom side of the water tub 1 is closed according to operation of the drainage motor 6 while the brake part 200 and the clutch part 300 are controlled by operation of the power switching motor 400.

Figure 7A:
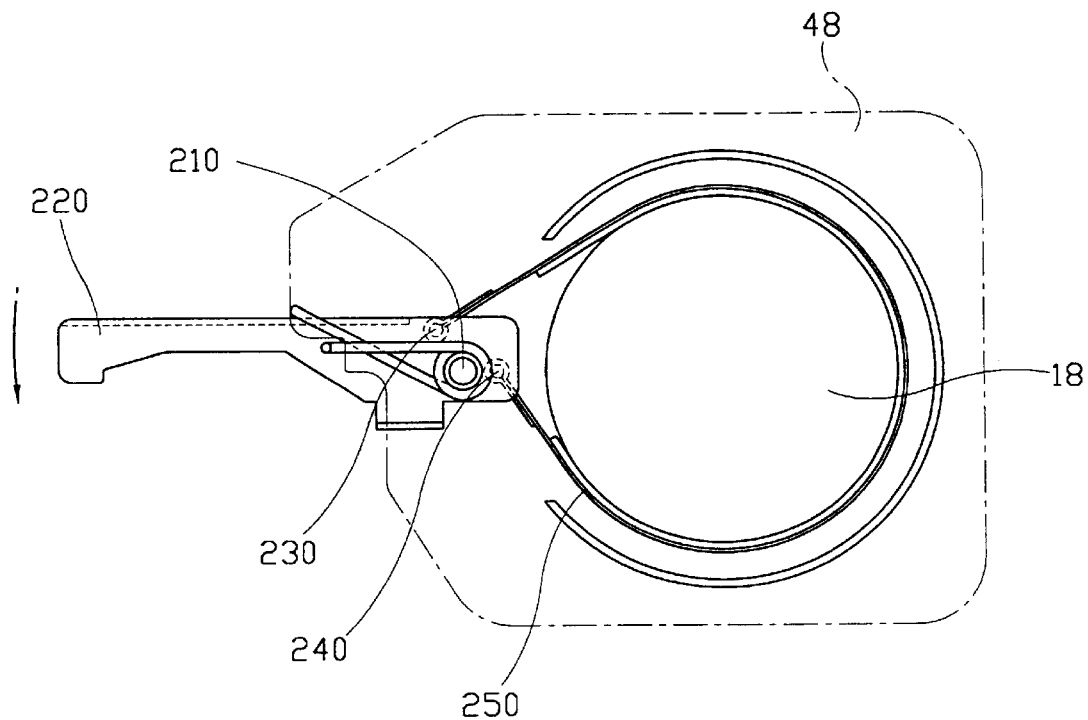
FIG. 7a is a plan for illustrating a brake band wound on a drum according to the present invention.

First, the drainage motor 6 closes the drainage hole 1a and the brake lever 220 of the brake part 200 is activated to an arrow direction as illustrated in FIG. 7a while the power switching motor 400 is inoperated in the first washing mode, pressing the brake band 250 to a peripheral surface of the drum 18.

Figure 8A:
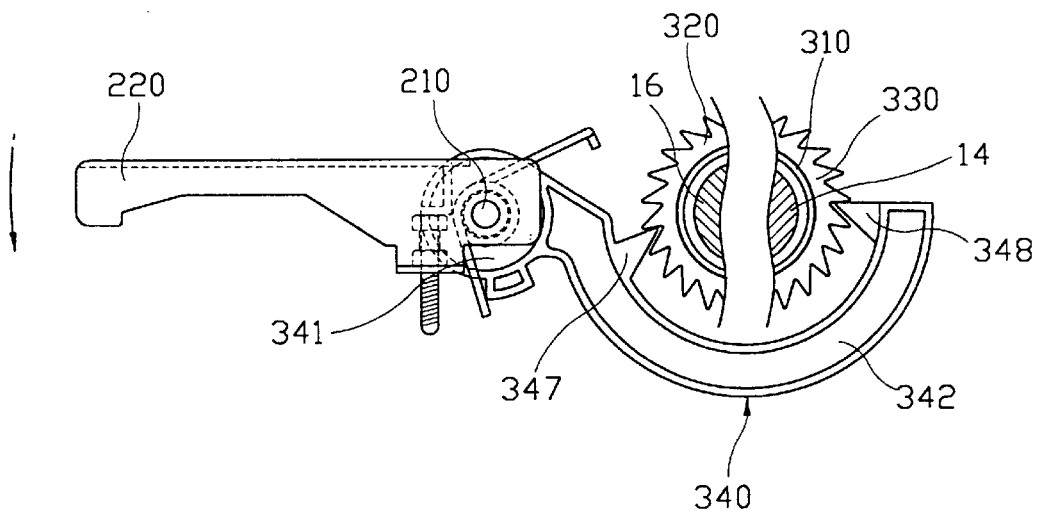
FIG. 8a is a plan for illustrating a clutch part winding a clutch spring according to the present invention.
Figure 9A:
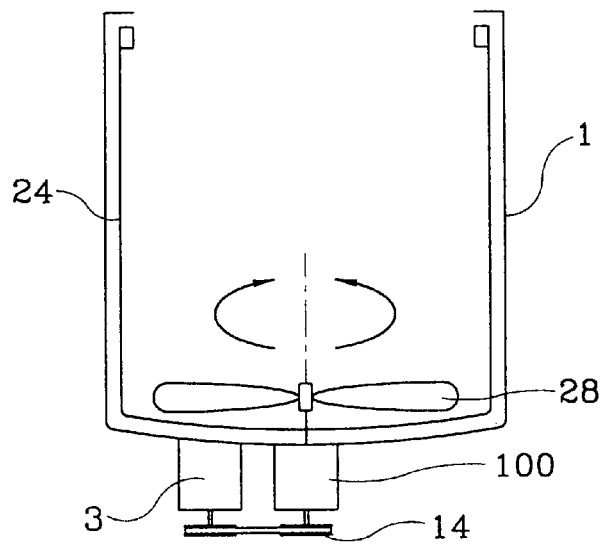
FIG. 9a is a schematic drawing for illustrating formation of a first water current according to the present invention.

Furthermore, the clutch lever 340 is activated as illustrated in FIG. 8a to urge the first and second latches 347 and 348 of the clutch lever 340 to rotate the upper and lower sleeves 320 and 330 in mutually opposite directions, thereby enlarging an inner diameter of the clutch spring 310, such that the drum 18 is braked of its force trying to rotate in both directions by force pulling both ends of the brake band 250 in mutually opposite directions, where the gear case 16 and the clutch spring 310 are forced to get into a non-rotational state, thereby causing the spin-dry tub 24 not to rotate as illustrated in FIG. 9a, and the pulsator 28 connected to a power line of driving shaft 10 repeats forward/backward rotations to form a first water current adequate for small grime (filthiness).

Figure 7B:
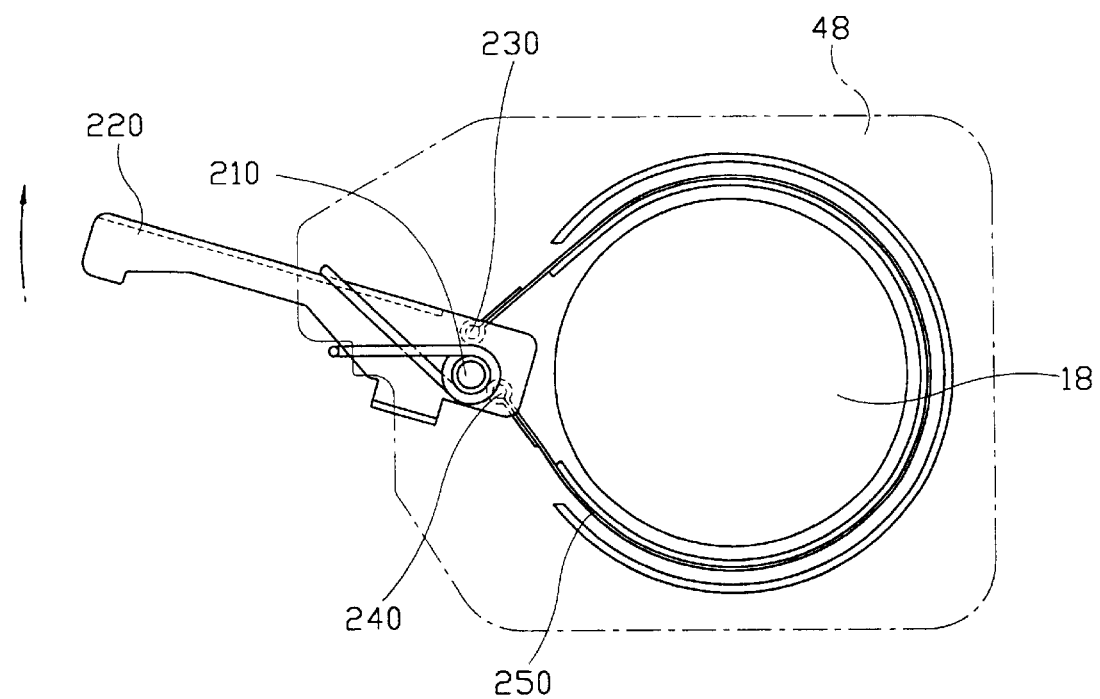
FIG. 7b is a plan for illustrating a brake band unwound from a drum according to the present invention.

When the power switching motor 400 is activated at the first step while the drainage hole 1a is closed in the second washing mode, the brake lever 220 is operated clockwise to as much as a predetermined angle as shown in FIG. 7b by force pulled by the power switching motor 400, where the brake band 250 is separated from the peripheral surface of the drum 18 to form a predetermined size of gap, thereby setting the drum 18 free.

The clutch lever 340 of the clutch part 300 enlarges the inner diameter of the clutch spring 310 as the first and second latches 347 and 348 at the clutch lever 340 rotate the upper/lower sleeves 320 and 330 in the mutually opposite directions as shown in FIG. 8a and as in the first washing mode.

At this time, the drum 18 is released of its contact with the brake band 250 by operation where both ends of the brake band 250 are widened in mutually opposite directions, thereby turning into a rotatable state, whereby the gear case 16 and the clutch spring 310, although being released of power from the driving shaft 10, are indirectly rotated by force of the drum 18 trying to rotate.

Figure 9B:
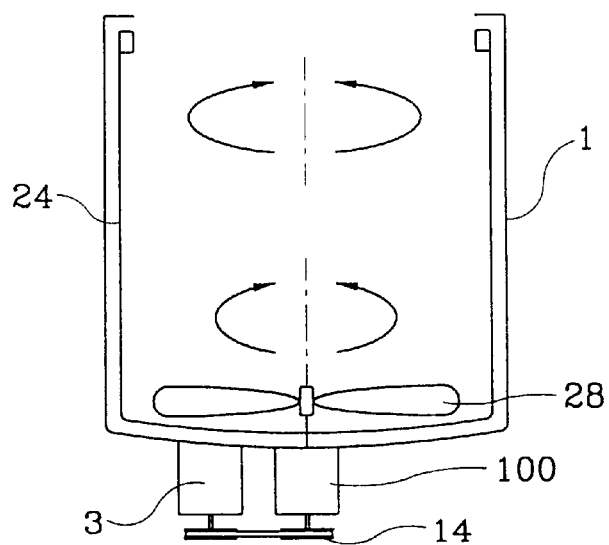
FIG. 9b is a schematic drawing for illustrating formation of a second water current according to the present invention.

In other words, although the spin-dry tub 24 obtains an indirect turning effect according to frictional force between the water current and the clothes in the water tub 1 when the pulsator 28 is rotated, the spin-dry tub 24 is actually slower in rotating speed than the pulsator 28, such that forward/backward rotations, which are opposite to those of the pulsator 28 as shown in FIG. 9b, are repeated to form a second water current which is powerful and adequate to dirtier clothes, quilt and the like.

When the power switching motor 400 is activated to a second step while the drainage hole 1a is closed in the third washing mode, the brake lever 220 is operated to a direction shown in FIG. 7b by force pulled by the power switching motor 400 to urge the brake band 250 to be detached from the peripheral surface of the drum 18 to as much as a predetermined distance while the clutch spring 310 disposed within the upper/lower sleeves 320 and 330 are shrunken in its inner diameter by inherent resilience to be wound on the external circumference at a border between the driving shaft coupling 14 and the gear case 16 and the drum 18, gear case 16, clutch spring 310, driving shaft coupling 14 and driving shaft 10 are connected by one power line at the same time.

Figure 9C:
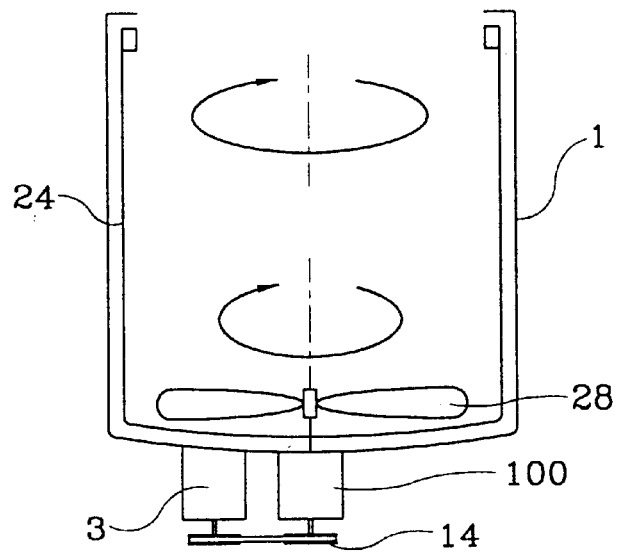
FIG. 9c is a schematic drawing for illustrating formation of a third water current according to the present invention.

At this time, the drum 18 is released of its contact with the brake band 250 by operation where both ends of the brake band 250 are widened to mutually opposite directions, while the gear case 16 is electrically connected to the driving shaft 10 by the clutch spring 310 such that the spin-dry tub 24 and the pulsator 28 are simultaneously rotated only to forward direction each at the same speed to form a third weak water current for protection of clothes such as wool, lingerie and the like, as illustrated in FIG. 9c.

When the power switching motor 400 is activated at the second step while the drainage hole 1a is closed in the fourth washing mode, the brake lever 220 and the clutch lever 340 are activated in the same fashion as in the third washing mode, setting the drum 18 rotatatively free and urging the gear case 16 to rotatively operate by receiving power from the driving shaft 10 via the clutch spring 310.

Figure 9D:
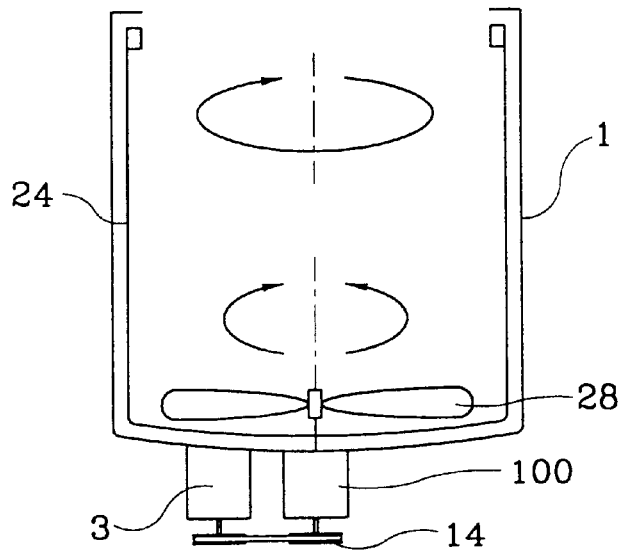
FIG. 9d is a schematic drawing for illustrating formation of a fourth water current according to the present invention.

When the driving motor 3 is driven in the forward and backward directions under the above-mentioned state, the pulsator 28 is also rotated in the forward/backward directions while the spin-dry tub 24 repeats rotations to the forward direction only as in FIG. 9d.

In other words, the forward rotational direction of the pulsator 28 is the same direction where the clutch spring 310 is wound on the external circumference at the border between the driving shaft coupling 14 and the gear case 16, such that, when the pulsator 28 is forwardly rotated, the spin-dry tub 24 connected to the gear case 16 and drum 18 via one power line is rotated in the same forward direction and at the same speed.

Figure 8B:
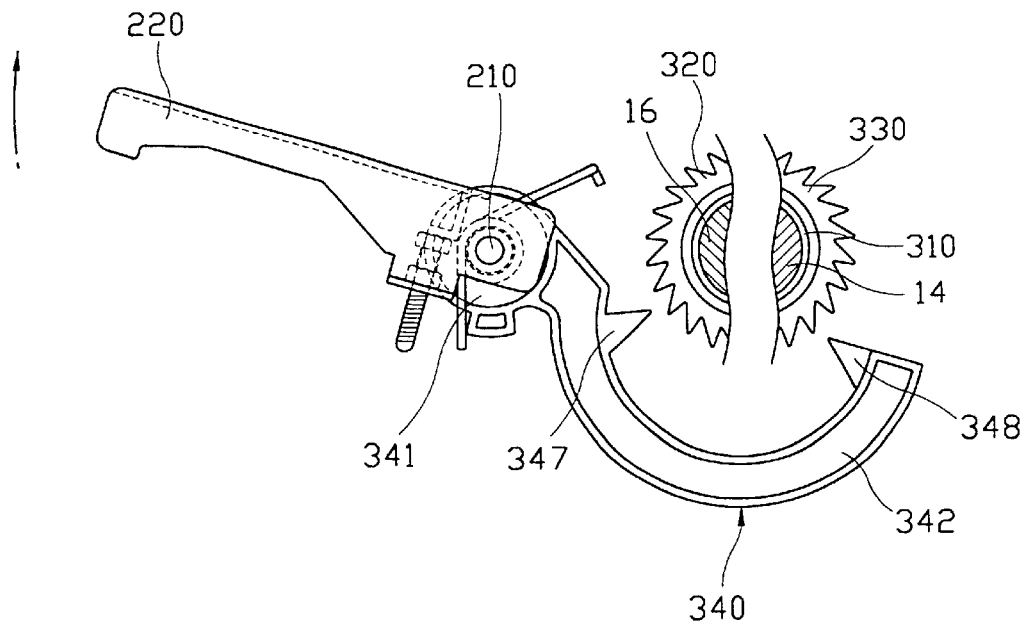
FIG. 8b is a plan for illustrating a clutch part unwound from a clutch spring according to the present invention.

However, when the pulsator 28 is backwardly rotated, the clutch spring 310 wound on the external circumference at the border between the driving shaft coupling 14 and the gear case operated to an unwinding direction as in FIG. 8b to disconnect the power to the driving shaft 14 and the gear case 16, such that, when the pulsator 28 is backwardly rotated, the spin-dry tub 24 cannot tag along in rotation with the pulsator 28 and spin-dry tub 24 is rotated only to one direction by inertia when the pulsator 28 is forwardly rotated.

Successively, the spin-dry tub 24 is forwardly rotated at the same speed and in the same direction when the pulsator 28 is forwardly rotated, and repeats the idling fuzzy course when the pulsator 28 is backwardly rotated, such that a fourth water current stronger than the water current in the third washing mode but weaker than the water current in the second washing mode can be formed.

Unlike the third washing mode, the fourth water current generates circulation or movement of cloths in the spin-dry tub 24 to increase washing efficiency by which damage to the clothes is decreased, such that the fourth water current is adequate to protection of cloths and washing of dirtier cloths.

Figure 10:
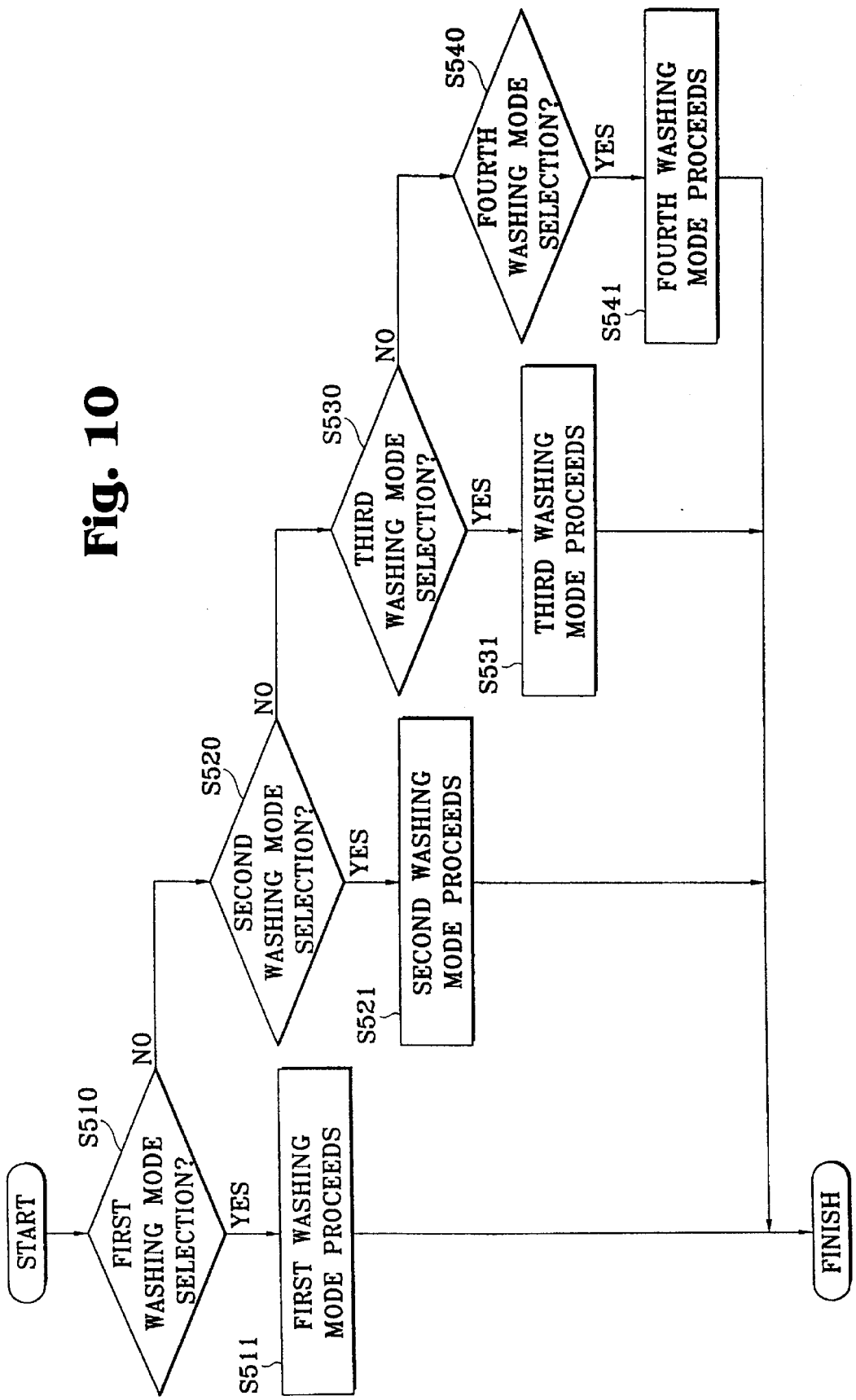
FIG. 10 is a washing flow chart according to the present invention.

Turning to FIG. 10, the washing control method thus operated according to the present invention includes steps (S510, S520, S530, S540) for selecting one of a plurality of cloth or one of a plurality of washing courses, and steps (S511, S521, S531, S541) for controlling a water current according to the selected cloth or selected washing course.

The water current control method thus established is stored in a microcomputer and is embodied by a course selected by a user, the method comprising:
  a first water current control method wherein the pulsator, and not the spin-dry tub, rotates in forward/backward direction;
  a second water current control method wherein a spin-dry tub repeats forward/backward rotations in opposite directions to those of the pulsator;
  a third water current control method wherein the pulsator and the spin-dry tub rotates in forward direction only; and
  a fourth water current control method wherein the second water current control is alternatively operated under the third water current control state.

By way of example, when a user selects a wool course (S530), a water current corresponding thereto is controlled (S531), and when a shirt course is selected (S520), a washing control step is taken where the second water current is controlled (S521).

As apparent from the foregoing, there is an advantage in the washing machine and its washing method thus described according to the present invention in that the washing machine has adopted a clutch structure wherein a power switching motor for controlling a brake band and a clutch lever in multi-state is separately applied from a drainage motor, such that various kinds of water currents can be embodied according to the multi-control of the power switching motor and a washing method adequate to needs of cloth protection and coping with varying cloths can be provided to thereby enable to protect damage of cloths in advance.

What is claimed is:

1. A washing method of a washing machine, the method comprising the steps of:
  selecting one of a plurality of washing modes;
  controlling a water current and controlling a speed of rotation and a direction of rotation of a pulsator and a spin-dry tub based on said selected washing mode;
  rotating the pulsator and the spin-dry tub in forward/ backward directions;
  rotating the pulsator and the spin-dry tub in one direction; and
  alternatively rotating the pulsator and the spin-dry tub in forward/backward directions or one direction.

2. The method as defined in claim 1, wherein the controlling a water current step does not comprise operating a separate drainage motor for opening and closing a drainage hole.

3. A washing method of a washing machine, the method comprising the steps of:
  loading said washing machine with clothes;
  selecting one of a plurality of washing modes;
  loading said washing machine with water and detergent;
  controlling a water current corresponding to said selected one of said plurality of washing modes after selection of one of said plurality of washing;
  rotating a pulsator in forward and backward directions while not rotating said spin dry tub when a first washing mode is selected;
  rotating said pulsator and said spin-dry tub in both forward and backward directions when a second washing mode is selected;
  rotating the pulsator and the spin-dry tub in one direction when a third washing mode is selected; and
  rotating the pulsator in both forward and backward directions while rotating the spin-dry tub one direction when a fourth washing mode is selected.

4. The method of claim 3, wherein said washing machine comprises:
  the spin-dry tub rotatably disposed in a water tub and connected to a drum and a gear case via a power line;
  the pulsator rotatably disposed in the spin-dry tub and connected to a driving shaft coupling and a driving shaft via power line;
  a brake band for braking and releasing the rotation of the drum;
  a clutch spring for disconnecting and connecting the power of the driving shaft coupling and the gear case; and
  power switching motor for controlling in multi-stage operations of clutch spring and the brake band.

5. The method of claim 3, wherein a brake band locks a drum from rotating, thereby preventing said spin dry tub from rotating when said first washing mode is selected.

6. The method of claim 3, wherein said spin dry tub being rotated in a direction opposite from a direction of rotation of said pulsator when said second washing mode is selected.

7. The method of claim 6, said spin dry tub being rotated slower speed than said pulsator when said second washing mode is selected.

8. The method of claim 7, wherein a brake band releases a drum, thereby enabling said spin dry tub to rotate when said second washing mode is selected.

9. The method of claim 3, wherein said pulsator and said spin dry tub both being driven to rotate in one direction, said pulsator and said spin dry tub both being rotated in the same direction when said third washing mode is selected.

10. The method of claim 9, wherein said pulsator and said spin dry tub both being rotated at the same speed when said third washing mode is selected.

11. The method of claim 3, wherein said spin dry tub rotates only in one direction while said pulsator rotates in both a forward and a backward direction when said fourth washing mode is selected.

12. The method of claim 11, wherein said pulsator and said spin dry tub both being rotated at the same speed when said fourth washing mode is selected.

13. A method of washing cloths in a washing machine, said method comprising the steps of:
  loading said washing machine with clothes;
  selecting one of a plurality of washing modes, each of said washing modes dictating a degree of agitation of water and clothes in a water tub during a washing cycle;

filling up said washing machine with water and adding detergent; and controlling the direction and speed of rotation of a pulsator and a spin-dry tub surrounding the pulsator based on said selected washing mode and when said spin dry tub is loaded with water, detergent and clothes.

14. The method of claim 13, wherein said pulsator rotating forward and backwards alternately while said spin dry tub is being restrained from rotating when a water tub is filled with clothes and water when a first washing mode is selected.

15. The method of claim 13, wherein both said spin dry tub and said pulsator alternately rotating forwards and backwards while said spin dry tub always rotating in a direction opposite said pulsator when a second mode of washing is selected.

16. The method of claim 13, wherein a spin dry tub and a pulsator both rotating in the same direction simultaneously when a third washing mode is selected.

17. The method of claim 13, wherein a spin dry tub being allowed to rotate in a single direction while a pulsator rotates alternately in a forward and a backward direction when a fourth washing mode is selected.

* * * * *